US012747672B1

(12) United States Patent
Weiss et al.

(10) Patent No.: US 12,747,672 B1
(45) Date of Patent: Sep. 29, 2026

(54) GAS TURBINE ENGINES HAVING SELF-COOLING SEALS AND METHODS OF OPERATING THE SAME

(71) Applicant: HONEYWELL INTERNATIONAL INC., Charlotte, NC (US)

(72) Inventors: William Weiss, Phoenix, AZ (US); Timothy Darling, Phoenix, AZ (US); Harry Kington, Phoenix, AZ (US); Jason Smoke, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/215,861

(22) Filed: May 22, 2025

(51) Int. Cl.
*F01D 11/00* (2006.01)
*F01D 11/08* (2006.01)
*F01D 25/12* (2006.01)

(52) U.S. Cl.
CPC .......... *F01D 11/003* (2013.01); *F01D 11/005* (2013.01); *F01D 25/12* (2013.01); *F01D 11/08* (2013.01); *F05D 2220/32* (2013.01); *F05D 2240/11* (2013.01); *F05D 2240/55* (2013.01); *F05D 2260/201* (2013.01)

(58) Field of Classification Search
CPC ........ F01D 11/005; F01D 11/003; F01D 9/04; F16J 15/0887; F16J 15/087; F16J 15/0893; F05D 2240/11
See application file for complete search history.

(56) References Cited

U.S. PATENT DOCUMENTS 3,754,766 A * 8/1973 Asplund .............. F16J 15/0887 415/134
6,435,824 B1 8/2002 Schell et al.
7,771,160 B2 8/2010 Shi et al.
8,303,245 B2 11/2012 Foster et al.
8,661,828 B2 * 3/2014 Pieussergues ............ F02C 7/28 60/753
9,869,201 B2 1/2018 Dyson et al.
(Continued)

FOREIGN PATENT DOCUMENTS

EP 3822458 B1 * 1/2023 ............. F01D 9/042

OTHER PUBLICATIONS

Raymond E Chupp, Robert C. Hendricks, Scott B. Lattime & Bruce M. Steinetz, Sealing in Turbomachinery, Aug. 1, 2006.

*Primary Examiner* — Courtney D Heinle
*Assistant Examiner* — Wesley Le Fisher
(74) *Attorney, Agent, or Firm* — Ingrassia Fisher & Lorenz

(57) ABSTRACT

A gas turbine engine having self-cooling seals and methods thereof are provided. The engines include a first component exposed to a high temperature environment, a second component that is not exposed the high temperature environment, and a seal between and in contact with the first and second components to separate a cavity therebetween to define a higher pressure region and a lower pressure region. The seal includes an annular body encircling a longitudinal axis of the gas turbine engine. The annular body has an S-shaped cross-section biased to apply forces against the first and second components, a first and second contact portions in contact with the first and second components, respectively, and holes extending through the annular body that provide passage for fluid flow therethrough and direct the fluid flow toward the first contact portion for cooling thereof.

18 Claims, 4 Drawing Sheets

(56) References Cited

U.S. PATENT DOCUMENTS

| | | | | |
|---|---|---|---|---|
| 9,879,556 | B2 * | 1/2018 | Chuong | F01D 25/162 |
| 10,041,366 | B2 * | 8/2018 | Davis | F16J 15/0887 |
| 10,100,660 | B2 | 10/2018 | Sippel et al. | |
| 10,392,967 | B2 * | 8/2019 | Correia | F01D 11/005 |
| 10,436,041 | B2 | 10/2019 | Sarawate | |
| 11,028,712 | B2 * | 6/2021 | Tyler | F01D 11/08 |
| 11,118,475 | B2 | 9/2021 | Synnott et al. | |
| 11,181,002 | B2 | 11/2021 | Sarawate et al. | |
| 11,215,075 | B2 | 1/2022 | Freeman et al. | |
| 11,408,297 | B2 * | 8/2022 | Lienau | F01D 11/005 |
| 11,466,583 | B2 * | 10/2022 | Ganiger | F01D 11/005 |
| 11,629,607 | B2 | 4/2023 | Freeman et al. | |
| 11,746,668 | B2 * | 9/2023 | Jarrossay | F01D 9/04<br>415/170.1 |
| 11,920,487 | B1 * | 3/2024 | Clark | F01D 25/14 |
| 11,965,427 | B1 * | 4/2024 | Clark | F01D 11/003 |
| 12,044,130 | B2 | 7/2024 | Quach et al. | |
| 2011/0179798 | A1 * | 7/2011 | Pieussergues | F02C 7/28<br>277/650 |
| 2015/0345319 | A1 * | 12/2015 | Zelesky | F01D 11/005<br>277/591 |
| 2016/0312634 | A1 * | 10/2016 | Davis | F01D 11/003 |
| 2019/0218924 | A1 * | 7/2019 | Mulcaire | F23R 3/50 |
| 2021/0131298 | A1 * | 5/2021 | Ganiger | F01D 25/04 |

* cited by examiner

GAS TURBINE ENGINES HAVING SELF-COOLING SEALS AND METHODS OF OPERATING THE SAME

TECHNICAL FIELD

The present invention generally relates to gas turbine engines, and more particularly relates to gas turbine engines having self-cooling seals.

BACKGROUND

The aircraft industry's overall goal of improving engine performance has driven modern gas turbine engines to ever higher operating temperatures. Higher temperatures generally improve thermal efficiency and power output but they may also impose greater mechanical and thermal stresses on engine components. As a result, there is ongoing development of advanced materials, coatings, and cooling technologies to enhance the durability, heat resistance, and performance of turbine blades, combustors, and other components. Innovations such as single-crystal superalloys, ceramic matrix composites, and thermal barrier coatings have significantly increased the thermal capabilities of engine components while maintaining reliability and longevity in demanding operating environments.

Despite these improvements, there is an ongoing demand for engine components and designs that provide the capability of higher operating temperatures. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A gas turbine engine is provided that, in one example, includes a first component that is directly exposed to a high temperature environment during operation of the gas turbine engine, a second component adjacent to the first component, wherein the second component is not directly exposed the high temperature environment during the operation of the gas turbine engine, and a seal between and in contact with opposed surfaces of the first component and the second component, wherein the seal separating a cavity between the first component and the second component to define a higher pressure region and a lower pressure region. The seal includes an annular body encircling a longitudinal axis of the gas turbine engine. The annular body has an S-shaped cross-section biased outwardly in a radial direction to apply forces against the first component and the second component, a first contact portion in contact with the first component and a second contact portion in contact with the second component, and holes extending through the annular body that are configured to provide passage for fluid flow therethrough from the higher pressure region to the lower pressure region. The holes are configured to direct the fluid flow toward the first contact portion of the annular body and thereby provide cooling of the first contact portion during the operation of the gas turbine engine.

A method is provided that, in one example, includes operating a gas turbine engine having a first component that is directly exposed to a high temperature environment and a second component adjacent to the first component that is not directly exposed the high temperature environment, and providing a seal between and in contact with opposed surfaces of the first component and the second component. The seal separates a cavity between the first component and the second component to define a higher pressure region and a lower pressure region. The seal includes an annular body encircling a longitudinal axis of the gas turbine engine, includes an S-shaped cross-section biased outwardly in a radial direction to apply forces against the first component and the second component, and includes a first contact portion in contact with the first component and a second contact portion in contact with the second component. The method includes cooling the first contact portion of the annular body of the seal by directing a fluid flow through holes extending through the annular body from the higher pressure region to the lower pressure region toward the first contact portion of the annular body.

An aircraft is provided that, in one example includes a gas turbine engine having a first component that is directly exposed to a high temperature environment during operation of the gas turbine engine, a second component adjacent to the first component, wherein the second component is not directly exposed the high temperature environment during the operation of the gas turbine engine, and a seal between and in contact with opposed surfaces of the first component and the second component. The seal separates a cavity between the first component and the second component to define a higher pressure region and a lower pressure region. The seal includes an annular body encircling a longitudinal axis of the gas turbine engine. The annular body has an S-shaped cross-section biased outwardly in a radial direction to apply forces against the first component and the second component, has a first contact portion in contact with the first component and a second contact portion in contact with the second component, and has holes extending through the annular body that are configured to provide passage for fluid flow therethrough from the higher pressure region to the lower pressure region. The holes are configured to direct the fluid flow toward the first contact portion of the annular body and thereby provide cooling of the first contact portion during the operation of the gas turbine engine.

Furthermore, other desirable features and characteristics of the gas turbine engines, methods, and aircraft will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Briefly, systems and methods disclosed herein provide gas turbine engines, such as those used to propel aircraft. The engines include seals configured to be disposed between relatively higher temperature components and lower temperature components. The seals are configured to be self-cooling to reduce thermal stresses that occur along the body of the seals. In particular, the seals include holes that direct fluid flow toward hot spots of the seals. Although the seals are primarily discussed herein as being in contact with shrouds in turbine sections of gas turbine engines, the seals are not limited to this application and may be used in other locations within a gas turbine engine and may be in contact with other components.

Figure 1:
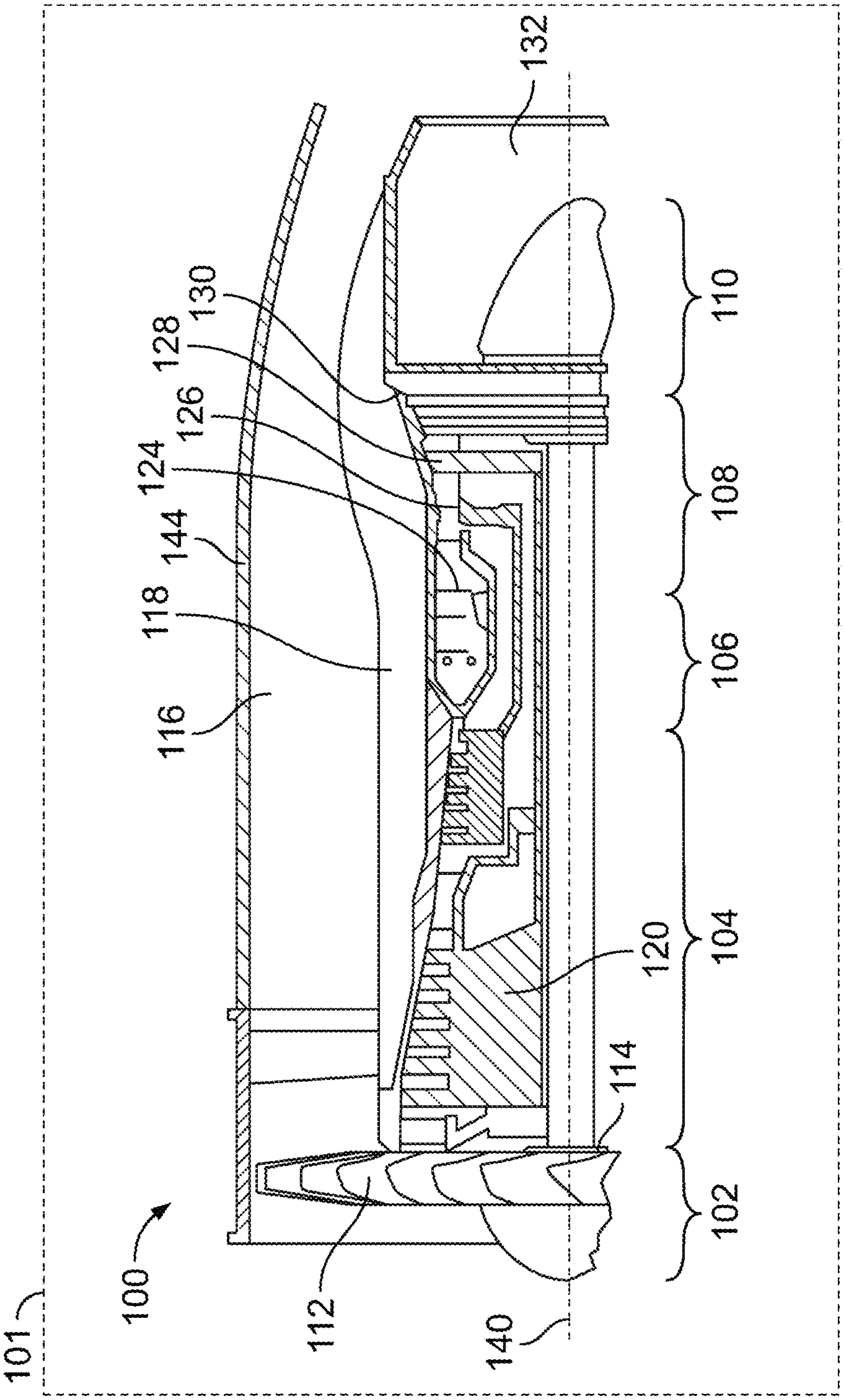
FIG. 1 is a schematic, cross-sectional view of a gas turbine engine according to in accordance with an embodiment.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, an industrial power generator, or other turbomachine.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors 120 in the compressor section 104 and the configuration thereof may vary. The one or more compressors 120 sequentially raise the pressure of the air and direct a majority of the high-pressure fluid or air into the combustor section 106. In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 132. As the turbines 126, 128, 130 rotate, each drives equipment in the gas turbine engine 100 via concentrically disposed shafts or spools.

Figure 2:
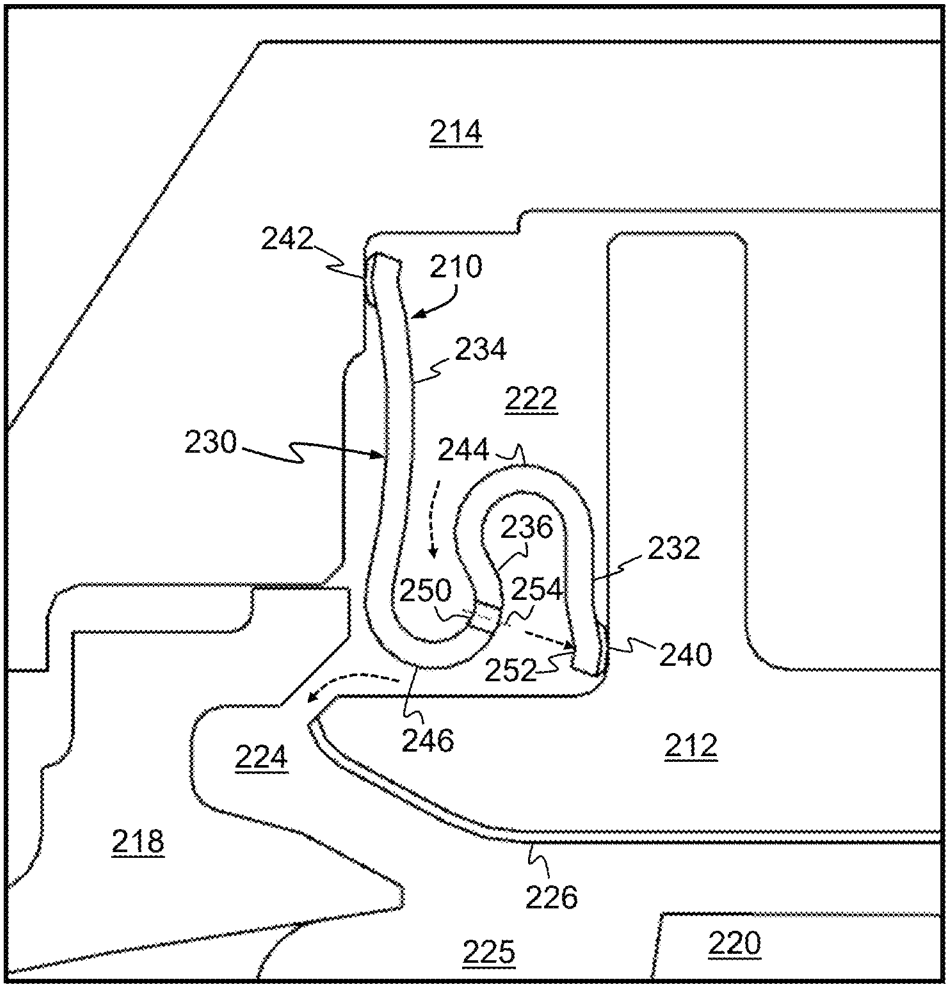
FIG. 2 is an enlarged, cross-sectional view of a portion of the gas turbine engine of FIG. 1 in accordance with an embodiment.

The gas turbine engine 100 includes at least one seal disposed between first and second components to provide sealing within a cavity therebetween. For example, FIG. 2 represents an enlarged portion of the high-pressure turbine 126 which includes an exemplary seal 210. Other components represented in FIG. 2 include portions of a shroud 212, a high-pressure turbine case 214, a nozzle assembly 218, and a turbine blade 220. In some examples, the shroud 212 may be a full ring shroud. During operation of the gas turbine engine 100, the high-temperature combustion air or combustive gas flow from the combustor section 106 is directed through a flow path 225 in the turbine section 108. The high-temperature combustion air or combustive gas impinges nozzles and turbine blades of the high-pressure turbine 126, including the turbine blade 220.

The shroud 212 is radially outward from the turbine blade 220 and may include an environmental barrier coating (EBC) or a thermal barrier coating (TBC) 226 that receives a tip of the turbine blade 220. The seal 210 provides a sealing function between the shroud 212 and the high-pressure turbine case 214 within a cavity therebetween. In general, the cavity includes a higher-pressure region 222 on a radially outer side of the seal 210, and a lower-pressure region 224 on a radially inner side of the seal 210. As such, fluid within the cavity is biased to flow from the higher-pressure region 222 to the lower-pressure region 224 during operation of the gas turbine engine 100. The seal 210 is configured to limit and/or control the fluid leakage from the higher-pressure region 222 to the lower-pressure region 224, and eventually to the flow path 225.

In this example, the seal 210 is also configured to maintain a fixed position of the shroud 212. Specifically, the seal 210 applies an axial force (spring load) against a first side of the shroud 212, and a second side of the should 212 is in contact with a fixed, stationary surface (not shown). In various examples, the forces applied by the annular body 230 are sufficient to maintain the fixed position of the shroud 212 and simultaneously resist displacement of the annular body 230 due to pressure forces applied thereon by fluid within the higher-pressure region 222. However, these forces applied by the annular body 230 on the shroud 212 are sufficiently limited to avoid placing excessive force on the shroud 212 that may result in damage thereto.

The seal 210 includes an annular body 230 encircling the longitudinal axis 140 of the gas turbine engine 100. As represented in FIG. 2, the annular body 230 has an S-shaped cross-section that is biased outwardly in the radial direction to apply forces against the shroud 212 and the high-pressure turbine case 214. The S-shaped cross-section of the annular body 230 includes a first end portion 232 that includes a first contact portion 240, a second end portion 234 that includes a second contact portion 242, and a central portion 236 between the first end portion 232 and the second end portion 234. The annular body 230 includes a first bend 244 between the first end portion 232 and the central portion 236 that has a sufficient radius of curvature to position the first end portion 232 and the central portion 236 to be overlapping, for example, in the radial direction of the gas turbine engine 100, with the first end portion 232 axially aft of the central portion 236. Similarly, the annular body 230 includes a second bend 246 between the second end portion 234 and the central portion 236 that has a sufficient radius of curvature to position the second end portion 234 and the central portion 236 to be overlapping, for example, in the radial direction of the gas turbine engine 100, with the second end portion 234 axially forward of the central portion 236.

In this example, the first end portion 232 is axially aft of the second end portion 234 and extends radially inward and the second end portion 234 is axially forward of the first end portion 232 and extends radially outward. In some examples, a distal end of the second end portion 234 extends further from the central portion 236 than a distal end of the first end portion 232. In such examples, the longer second end portion 234 may promote compliance (e.g., lower stiffness) which may allow for higher deflection during assembly to achieve a given preload. The seal 210 is in contact with axially opposed surfaces of the shroud 212 and the high-pressure turbine case 214, with the seal 210 contacting the shroud 212 with the first contact portion 240 and contacting the high-pressure turbine case 214 with the second contact portion 242. In this example, the first contact portion 240 and the second contact portion 242 include optional wear coatings configured to promote improved wear characteristics of the seal 210.

The annular body 230 includes a plurality of annularly spaced apart bypass holes 250 extending about a circumference thereof. In this example, the bypass holes 250 are formed in the central portion 236 of the annular body 230. The bypass holes 250 provide for passage of fluid flow therethrough from the higher-pressure region 222 to the lower-pressure region 224. The sizes and quantity of the bypass holes 250 may be selected to control or meter a desired amount of secondary flow between the higher-pressure region 222 to the lower-pressure region 224. In FIG. 2, fluid flow is represented with dotted arrows. With the exemplary S-shaped cross-section of FIG. 2, the fluid flow is directed between the second end portion 234 and the central portion 236, through the bypass holes 250, and then between the central portion 236 and the first end portion 232.

With the arrangement of FIG. 2, the shroud 212 is directly exposed to a high temperature environment during operation of the gas turbine engine 100. Specifically, the shroud 212 is exposed to the high-temperature combustion air or combustive gas flowing from the combustor section 106 through the flow path 225. In contrast, the high-pressure turbine case 214 is not directly exposed to this high temperature environment, or at least may be partially insulated therefrom by other components of the gas turbine engine 100, such as the shroud 212 and the nozzle assembly 218.

At least in part due to the differences in operating temperatures, the shroud 212 and the high-pressure turbine case 214 may be formed of or include different materials, coating systems, etc. In various examples, the shroud 212 may be formed of or predominately formed of a ceramic material and the high-pressure turbine case 214 may be formed of or predominately formed of a metallic material.

The differences in operating temperature between the shroud 212 and the high-pressure turbine case 214 have the potential to result in a significant temperature difference between the first contact portion 240 and the second contact portion 242. This thermal gradient, in combination with stress due to the compression of the seal 210, could reduce strength of the seal 210 over time. In particular, the first contact portion 240 could be a hot spot during operation of the gas turbine engine 100. As such, the first end portion 232 could undergo more thermal expansion than the cooler second end portion 234, leading to internal stresses. Over an extended time, these stresses could potentially cause plastic deformation which in turn may cause cracks or fractures to develop and potentially lead to failure of the seal 210.

To mitigate or eliminate these potential thermal stresses, the bypass holes 250 are configured to direct the fluid flow therethrough toward the first contact portion 240 of the annular body 230 and thereby provide cooling of the first contact portion 240 during operation of the gas turbine engine 100. For example, the bypass holes 250 may have a central axis 254 that may be oriented to direct the fluid flowing through the bypass holes 250 toward a surface 252 of the first end portion 232. Upon impact of the fluid flow with the surface 252, the temperature of the first end portion 232 and the first contact portion 240 may be reduced. In this manner, cooling capacity of the fluid flow that may otherwise be wasted may be utilized to reduce the temperature gradient across the seal 210, and thereby extend the operating life thereof and/or allow for increased contact temperatures. In some examples, the fluid flow may be received from the compressor section 104, and may be relatively cool relative to the temperatures present in the turbine section 108.

Figure 3:
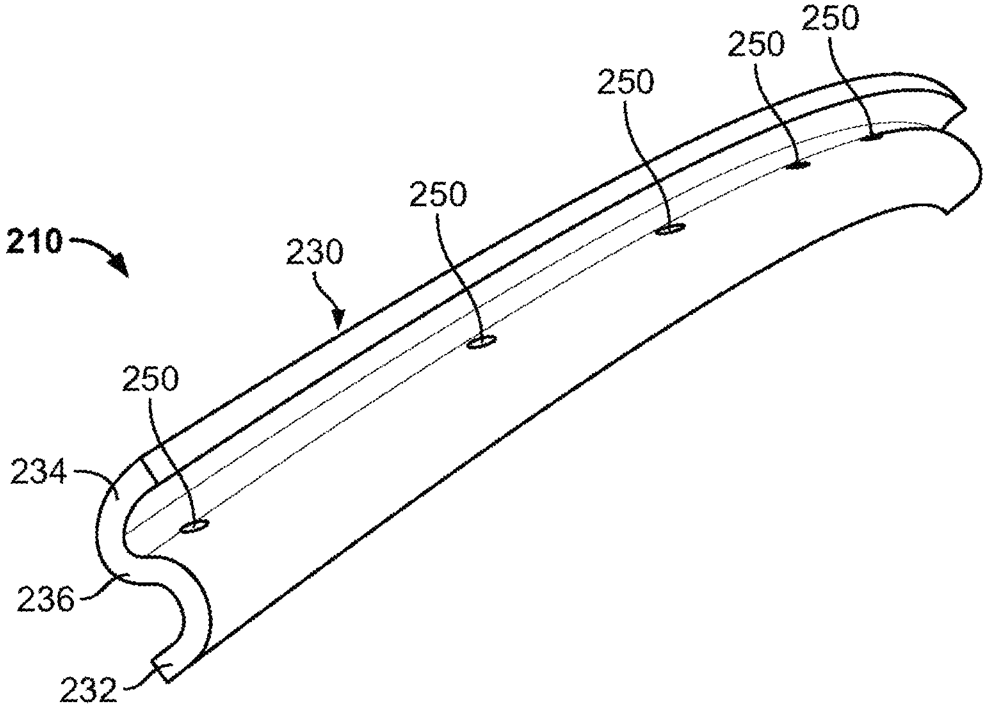
FIGS. 3 and 4 include first and second partial, perspective views of a seal of the gas turbine engine of FIGS. 1 and 2 in accordance with an embodiment.
Figure 4:
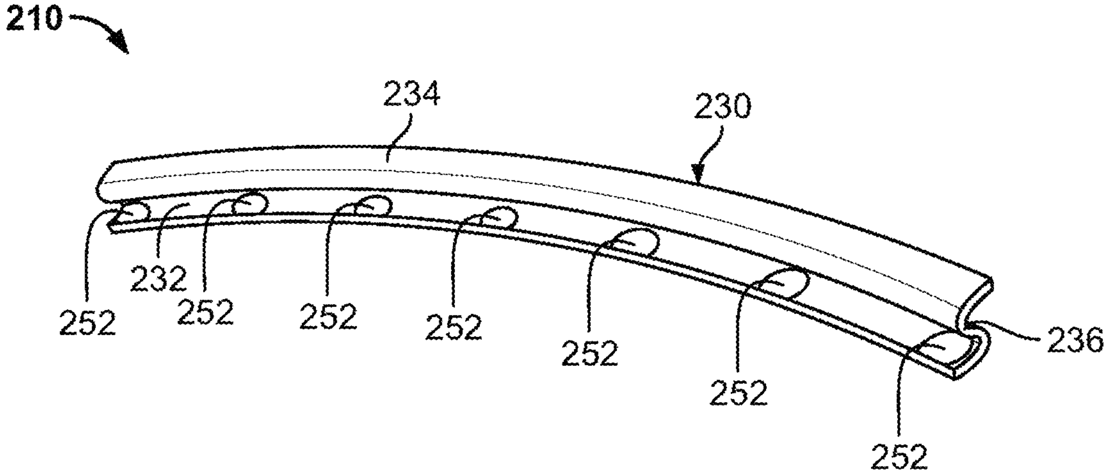

FIGS. 3 and 4 represent partial, perspective views of the seal 210 in accordance with various examples. FIG. 3 represents the seal 210 as viewed from a radially outward to radially inward viewpoint, and FIG. 4 represents the seal 210 as viewed from a radially inward to a radially outward viewpoint. As represented, the bypass holes 250 represented in FIG. 3 are aligned with the surfaces 252 that are cooled by the fluid flow passing through the bypass holes 250 during operation of the gas turbine engine 100. In various examples, the size and spacing of the bypass holes 250 may be selected to promote cooling of the surfaces 252. In various examples, the size and spacing of the bypass holes 250 may be selected to balance the cooling of the surfaces 252 and the metering of the fluid flow between the higher-pressure region 222 to the lower-pressure region 224.

The seal 210 may be formed of or include various materials, such as certain metallic materials. Nonlimiting examples of materials that may be suitable for the seal 210 may include certain nickel-based superalloys such as Waspaloy®, Haynes 282®, Haynes 233®), and Rene 41®. The seal 210 may be formed by various processes such as, but not limited to, certain pressing processes or additive manufacturing processes.

Figure 5:
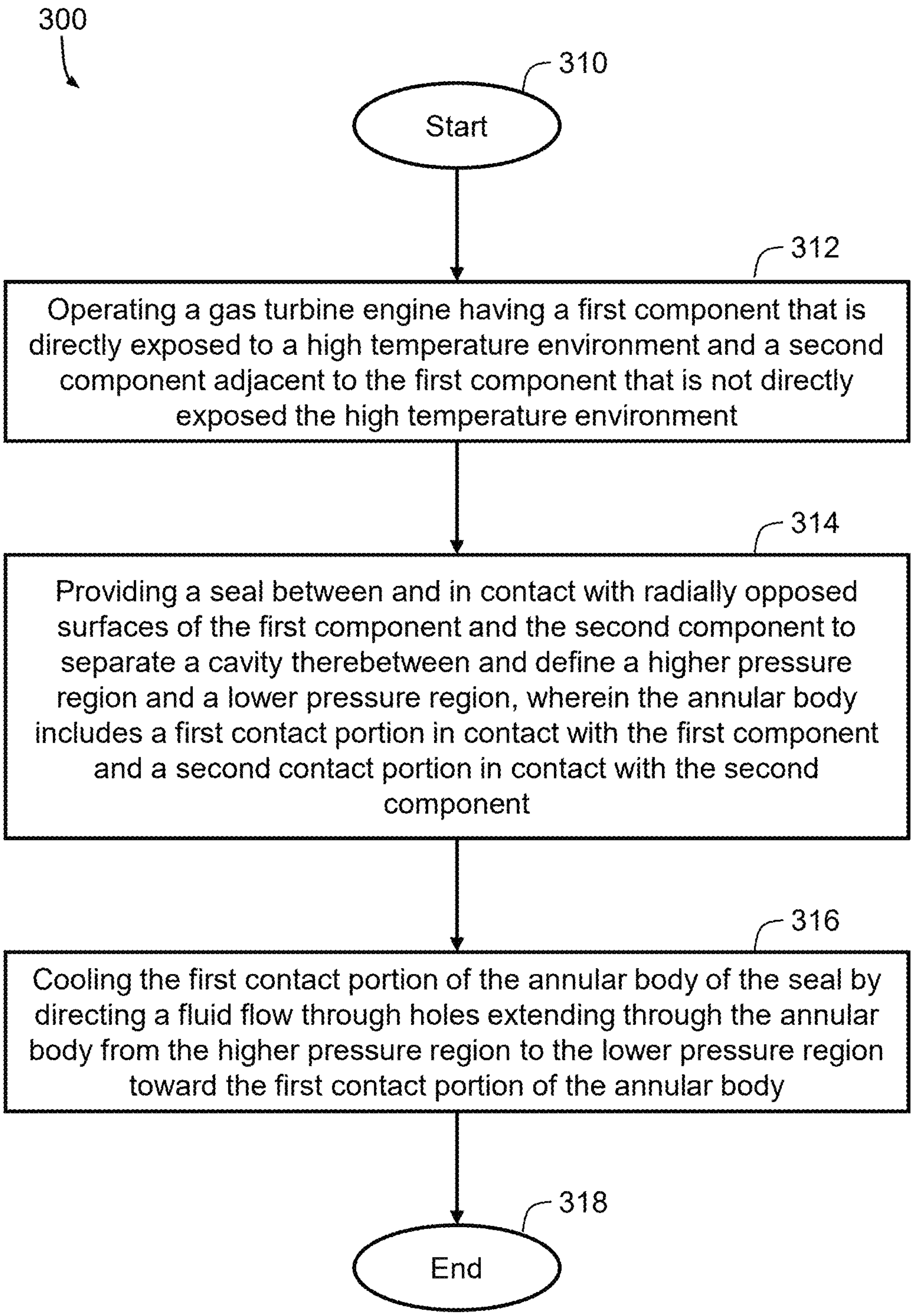
FIG. 5 is a flowchart illustrating an exemplary method for cooling a seal during operation of a gas turbine engine in accordance with an embodiment.

The seals and gas turbine engines disclosed herein, including the seal 210 and the gas turbine engine 100, provide for methods of cooling seals during operation of gas turbine engines. For example, FIG. 5 is a flowchart illustrating an exemplary method 300. The method 300 may start at 310. At 312, the method 300 may include operating a gas turbine engine having a first component that is directly exposed to a high temperature environment and a second component adjacent to the first component that is not directly exposed the high temperature environment.

At 314, the method 300 may include providing a seal between and in contact with radially opposed surfaces of the first component and the second component. The seal separates a cavity between the first component and the second component to define a higher pressure region and a lower pressure region. The seal has an annular body encircling a central axis of the gas turbine engine, has an S-shaped cross-section biased outwardly in the radial direction to apply forces against the first component and the second component, and has a first contact portion in contact with the first component and a second contact portion in contact with the second component.

At 316, the method 300 may include cooling of the first contact portion of the annular body of the seal by directing a fluid flow through holes extending through the annular body from the higher pressure region to the lower pressure region toward the first contact portion of the annular body. The method 300 may end at 318.

The seals, gas turbine engines, and methods disclosed herein provide various benefits over certain existing systems and methods. For example, directing the fluid flow from bypass holes in a seal to cool high temperature surfaces of the seal may provide improved seal operating life and/or improved operating temperature limits. As such, the seals may simultaneously provide sealing, loading, and self-cooling functions. In some examples, the self-cooling seals may reduce the number of other components within the gas turbine engines that would otherwise be necessary to mitigate the temperature differences therein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:

a first component that is directly exposed to a high temperature environment during operation of the gas turbine engine;

a second component adjacent to the first component, wherein the second component is not directly exposed the high temperature environment during the operation of the gas turbine engine; and a seal between and in contact with opposed surfaces of the first component and the second component, the seal separating a cavity between the first component and the second component to define a higher pressure region and a lower pressure region, the seal comprising:

an annular body encircling a longitudinal axis of the gas turbine engine, the annular body having an S-shaped cross-section biased outwardly in a radial direction to apply forces against the first component and the second component, wherein the annular body includes a first contact portion in contact with the first component and a second contact portion in contact with the second component, wherein the S-shaped cross-section of the annular body includes a first end portion that includes the first contact portion, a second end portion that includes the second contact portion, and a central portion between the first end portion and the second end portion; and holes extending through the central portion of the annular body that are configured to provide passage for fluid flow therethrough from the higher pressure region to the lower pressure region, wherein the holes are configured to direct the fluid flow toward the first contact portion of the annular body and thereby provide cooling of the first contact portion during the operation of the gas turbine engine, wherein the fluid flow is directed between the second end portion and the central portion, through the holes, and then between the central portion and the first end portion.

2. The gas turbine engine of claim 1, wherein the forces applied by the annular body are sufficient to maintain a fixed position of the first component and simultaneously resist displacement of the seal due to pressure forces applied on the seal by the higher pressure region.

3. The gas turbine engine of claim 1, wherein the first end portion is axially aft of the second end portion and extends radially inward and the second end portion is axially forward of the first end portion and extends radially outward.

4. The gas turbine engine of claim 1, wherein the annular body includes a first bend between the first end portion and the central portion that is sufficient to position the first end portion and the central portion to be overlapping with the first end portion axially aft of the central portion, and the annular body includes a second bend between the second end portion and the central portion that is sufficient to position the second end portion and the central portion to be overlapping with the second end portion axially forward of the central portion.

5. The gas turbine engine of claim 1, wherein the first component is formed of or predominately formed of a ceramic material, the second component is formed of or predominately formed of a first metallic material, and the annular body of the seal is formed of or predominately formed of a second metallic material.

6. The gas turbine engine of claim 1, wherein the first component is a shroud in a turbine section of the gas turbine engine.

7. The gas turbine engine of claim 1, wherein the holes have a central axis oriented to direct the fluid flowing through the holes directly toward a surface of the first end portion, wherein the surface of the first end portion is a hot spot of the annular body during operation of the gas turbine engine.

8. A method, comprising:

operating a gas turbine engine having a first component that is directly exposed to a high temperature environment and a second component adjacent to the first component that is not directly exposed the high temperature environment;

providing a seal between and in contact with radially opposed surfaces of the first component and the second component, the seal separating a cavity between the first component and the second component to define a higher pressure region and a lower pressure region, the seal comprising an annular body encircling a longitudinal axis of the gas turbine engine, the annular body having an S-shaped cross-section biased outwardly in a radial direction to apply forces against the first component and the second component, wherein the annular body includes a first contact portion in contact with the first component and a second contact portion in contact with the second component;

configuring the S-shaped cross-section of the annular body to include a first end portion that includes the first contact portion, a second end portion that includes the second contact portion, and a central portion between the first end portion and the second end portion, wherein the central portion includes holes extending through the annular body;

configuring the annular body to include a first bend between the first end portion and the central portion that is sufficient to position the first end portion and the central portion to be overlapping with the first end portion axially aft of the central portion, and to include a second bend between the second end portion and the central portion that is sufficient to position the second end portion and the central portion to be overlapping with the second end portion axially forward of the central portion; and cooling of the first contact portion of the annular body of the seal by directing a fluid flow through the holes extending through the central portion of the annular body from the higher pressure region to the lower pressure region toward the first contact portion of the annular body.

9. The method of claim 8, further comprising configuring the annular body of the seal such that the forces applied thereby are sufficient to maintain a fixed position of the first component and simultaneously resist displacement of the seal due to pressure forces applied on the seal by the higher pressure region.

10. The method of claim 8, further comprising orienting the seal such that the first end portion is axially aft of the second end portion and extends radially inward and the second end portion is axially forward of the first end portion and extends radially outward.

11. The method of claim 8, further comprising directing the fluid flow between the second end portion and the central portion, through the holes, and then between the central portion and the first end portion.

12. The method of claim 8, further comprising producing the first component to be formed of or predominately formed of a ceramic material, producing the second component to be formed of or predominately formed of a first metallic material, and producing the annular body of the seal to be formed of or predominately formed of a second metallic material.

13. The method of claim 8, wherein the first component is a shroud in a turbine section of the gas turbine engine.

14. The method of claim 8, further comprising configuring the annular body such that the holes have a central axis oriented to direct the fluid flowing through the holes directly toward a surface of the first end portion, wherein the surface of the first end portion is a hot spot of the annular body during operation of the gas turbine engine.

15. An aircraft, comprising:

a gas turbine engine, comprising:

a first component that is directly exposed to a high temperature environment during operation of the gas turbine engine;

a second component adjacent to the first component, wherein the second component is not directly exposed the high temperature environment during the operation of the gas turbine engine; and a seal between and in contact with radially opposed surfaces of the first component and the second component, the seal separating a cavity between the first component and the second component to define a higher pressure region and a lower pressure region, the seal comprising:

an annular body encircling a longitudinal axis of the gas turbine engine, the annular body having an S-shaped cross-section biased outwardly in a radial direction to apply forces against the first component and the second component, wherein the annular body includes a first contact portion in contact with the first component and a second contact portion in contact with the second component; and holes extending through the annular body that are configured to provide passage for fluid flow therethrough from the higher pressure region to the lower pressure region, wherein the holes are configured to direct the fluid flow toward the first contact portion of the annular body and thereby provide cooling of the first contact portion during the operation of the gas turbine engine, wherein the S-shaped cross-section of the annular body includes a first end portion that includes the first contact portion, a second end portion that includes the second contact portion, and a central portion between the first end portion and the second end portion, wherein the central portion includes the holes extending therethrough, wherein the first end portion is axially aft of the second end portion and extends radially inward and the second end portion is axially forward of the first end portion and extends radially outward, wherein the annular body includes a first bend between the first end portion and the central portion that is sufficient to position the first end portion and the central portion to be overlapping with the first end portion axially aft of the central portion, and the annular body includes a second bend between the second end portion and the central portion that is sufficient to position the second end portion and the central portion to be overlapping with the second end portion axially forward of the central portion, wherein the fluid flow is directed between the second end portion and the central portion, through the holes, and then between the central portion and the first end portion, wherein the holes have a central axis oriented to direct the fluid flowing through the holes directly toward a surface of the first end portion.

16. The aircraft of claim 15, wherein the first component is a shroud in a turbine section of the gas turbine engine.

17. The aircraft of claim 15, wherein the surface of the first end portion is a hot spot of the annular body during operation of the gas turbine engine.

18. The aircraft of claim 15, wherein a distal end of the second end portion extends further from the central portion than a distal end of the first end portion.

* * * * *